June 12, 1928.  H. M. R. DAM  1,673,401
ELECTRIC BATTERY
Original Filed Sept. 23, 1924
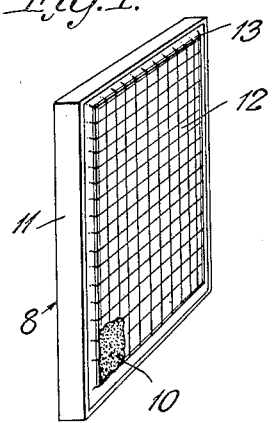
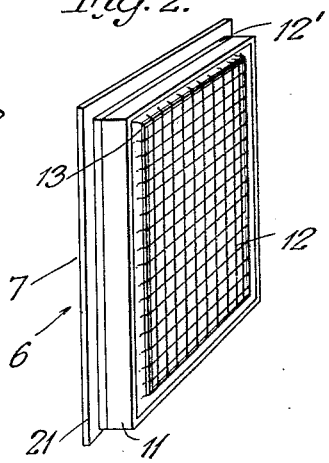
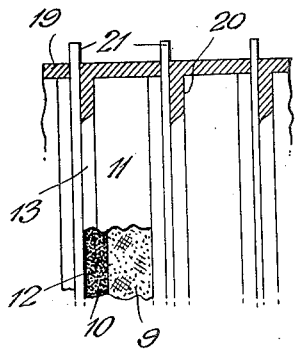
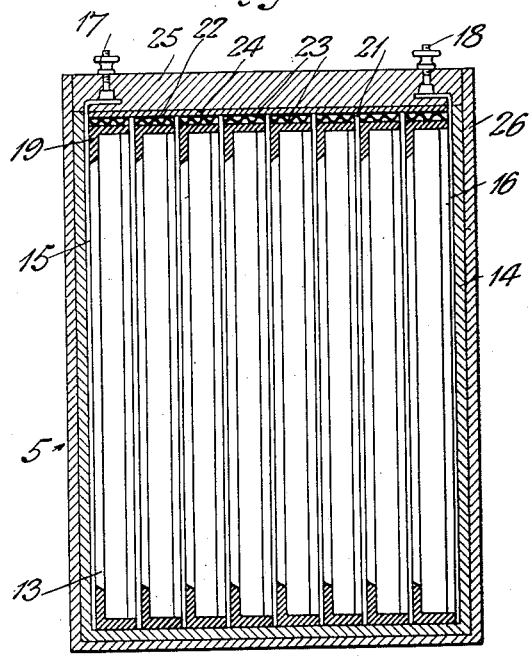
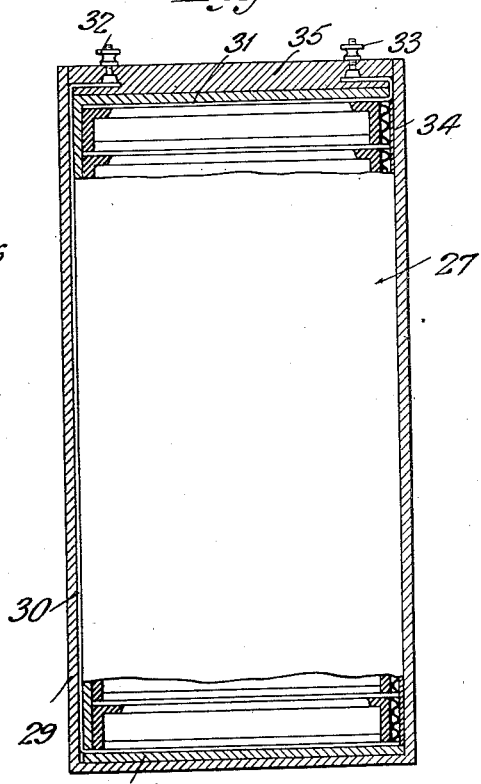
INVENTOR.
Henry M. Rosendal Dam
BY
Williams & Pritchard
ATTORNEYS Patented June 12, 1928.

1,673,401

UNITED STATES PATENT OFFICE.

HENRY M. ROSENDAL DAM, OF QUEENS VILLAGE, NEW YORK, ASSIGNOR TO JOSEPH BLOCK, OF BROOKLYN, NEW YORK.

ELECTRIC BATTERY.

Original application filed September 23, 1924, Serial No. 739,278. Divided and this application filed December 15, 1924, Serial No. 755,879. Renewed November 19, 1927.

This invention relates to electric batteries, and this application is a division of my application Serial No. 739,278, filed September 23rd, 1924.

An important object of my invention is to provide a generally improved battery embodying a plurality of cells of the flat type so connected electrically as to offer a minimum resistance to the flow of an electric current therethrough and so assembled as to provide a compact, rigid, and durable structure.

Other objects and certain advantages of the invention will become apparent from the following description when taken in connection with the accompanying drawings in which:

Figure 1 is a perspective view of a cell unit.

Figure 2 is a perspective view of a cell having incorporated therein the unit shown in Figure 1.

Figure 3 is a vertical sectional view through a battery made up of a plurality of cells of the type shown in Figure 2, the cells being shown in elevation and in a face to face relation.

Figure 4 is a somewhat enlarged fragmental view showing in elevation a plurality of cells arranged in a face to face relation and surrounded with a suitable sealing material.

Figure 5 is a view similar to that of Figure 3 showing a somewhat modified form of battery employing a plurality of cells of the type shown in Figure 2.

In the case of multiple cell batteries such as that shown in Figure 3 and indicated as a whole by the numeral 5 I employ a plurality of individual cells 6 arranged in a face to face relation as a result of which arrangement the cells are connected in series, as will be appreciated. The cells entering into the battery construction, herein shown, are each made up of a negative electrode in the form, preferably, of a zinc plate 7, associated with a cell unit 8, constructed in accordance with the process described in Patent No. 1,653,600, granted to me December 20, 1927, by which process depolarizing material 9 and graphite 10 are compressed into cake form and intimately united within a suitable frame 11, the graphite serving as the positive electrode of the cell and being provided with a metallic facing 12, such as tin foil, overlying the protruding area 13 of the electrode. This process and the cell unit produced thereby are claimed in my said application, Ser. No. 755,880, filed Dec. 15, 1924, and therefore, said process is not claimed herein and said cell unit is not separately claimed herein.

In assembling the unit 6, shown in Figure 2, a moistened pulp-board 12' carrying a suitable electrolytic paste, not shown, is placed in position upon the unit 8 adjacent the depolarizing material 9, whereupon the zinc plate 7 is arranged or placed upon the pulp-board as shown. These three elements, namely, the unit 8, pulp-board 12', and zinc plate 7 are then pressed firmly together with the result that the several elements of the cell are physically united in their proper respective positions as shown.

In assembling the battery 5 a suitable number of cells 6 are so placed within an inner insulating container 14 that the negative electrodes of the several cells engage the positive electrodes of adjacent cells, suitable conductors 15 and 16 being provided and maintained in contact with the positive and negative electrodes, respectively, of the outermost cells as shown. These conductors are, at their upper ends, bent at right angles and are connected to suitable terminals 17 and 18, respectively. After the cells have been placed within the container 14 a quantity of suitable sealing material, such as hot wax 19, is poured over the cells, whereupon it flows into the several pockets or grooves 20 formed intermediate the zinc electrode 7 and the cell units 8. This wax upon being introduced also serves to seal the jointure between the pulp-board 12' and the electrode 7 and cell unit 8, it being allowed to flow around the several units by reason of the fact that the units are held in a spaced relation to the sides of the container 14 by the overlying edges or projecting margins 21 of the zinc electrodes 7. After the wax has been introduced a strip of suitable material, such as corrugated paste board 22, is arranged above each cell intermediate the upper margins of the zinc electrodes of adjacent cells, thus providing a plurality of individual air spaces or pockets 23. Over the several cells there is arranged a strip of cardboard 24 which serves to prevent the entrance of a suitable sealing material, such as pitch 25, into the air pockets 23 when the pitch is poured over the several cells after the inner container 14 has been placed into a suitable outer receptacle 26.

While I have described the jointure between the pulp-board 12' and electrode 7 and unit 8, respectively, of the several cells as having been sealed by pouring the wax over the cells after they have been placed in the inner container 14, it may be found desirable in some instances to apply the wax to individual cells prior to introducing the same into the container. This practice may, of course, be resorted to without departing from the spirit of the invention.

In considering the modified form of cell 27, shown in Figure 5, the procedure in assembling the several cells within the inner container 28 is carried out substantially as above described. After these cells are assembled the container 28 is so introduced into the outer receptacle 29 that the several cells normally lie horizontally. In this construction the conductor 30 leading from the zinc electrode of the lowermost cell extends upwardly intermediate the inner and outer receptacles 28 and 29 whereas the other conductor 31 contacting with the positive electrode at the opposite end of the battery lies intermediate the uppermost cell of the inner receptacle 28, both conductors being bent at their ends and provided, respectively, with terminals 32 and 33. In this form of battery the cardboard strip 34, corresponding to the cardboard 24 of Figure 3, is arranged intermediate the projecting margins of the zinc electrode of the several cells and the outer container 29 and the pitch 35 employed as a sealing material for the battery is poured directly onto the upper end of the inner container as shown.

Having thus described my invention I claim:

1. A battery comprising a container; a plurality of cells arranged within said container, each of said cells comprising a cell unit having an electrode of a given polarity incorporated therein in plate form, and an electrode of opposed polarity associated with said unit and having its margin projecting beyond the corresponding margin of said cell unit whereby a space is afforded between said cell units and said container, one of said electrodes of each cell having a protruding area engaging an electrode of an adjacent cell; and a sealing material carried within the space afforded between said container and cell units.

2. A battery comprising a container; a plurality of cells arranged within said container, each of said cells comprising a cell unit having an electrode of a given polarity incorporated therein in plate form an electrode of opposed polarity associated with said unit and having its margin projecting beyond the corresponding margin of said cell unit whereby a space is afforded between said cell units and said container, one of said electrodes of each cell having a protruding area engaging an electrode of an adjacent cell; a sealing material carried within the space afforded between said container and cell units; and a sealing material overlying said cells and spaced therefrom to provide an air space adjacent each cell.

3. An electric battery comprising a plurality of individual electric cells, each of which consists of a negative element and a positive element secured together, the negative element of each cell projecting laterally beyond the positive element of the cell, the positive element in each cell having a raised portion adapted to contact with the negative element of the adjacent cell whereby to form a groove between adjacent cells extending around the same; and sealing material filled into said groove as and for the purposes set forth.

4. A battery comprising a container; a plurality of cells arranged within said container, each of said cells comprising an electrode in plate form and of a given polarity, and an electrode in plate form and of opposed polarity, the latter named electrode having its margin projecting beyond the corresponding margin of the first named electrode whereby spaces are afforded between said container and the first named electrodes, one of said electrodes of each cell having a protruding area engaging an electrode of an adjacent cell; and a sealing material carried within the spaces afforded between said container and the first named electrodes.

5. A battery comprising a container; a plurality of cells arranged within said container, each of said cells comprising an electrode in plate form and of a given polarity, and an electrode in plate form and of opposed polarity, the latter named electrode having its margin projecting beyond the corresponding margin of the first named electrode whereby spaces are afforded between said container and the first named electrodes, one of said electrodes of each cell having a protruding area engaging an electrode of an adjacent cell; a sealing material carried within the spaces afforded between said container and the first named electrodes; and a sealing material overlying said cells and spaced therefrom to provide an air space adjacent each cell.

In testimony whereof, I have affixed my signature to this specification.

HENRY M. ROSENDAL DAM.